Patented July 2, 1940

2,206,399

UNITED STATES PATENT OFFICE 2,206,399

PRODUCTION OF SUBSTANTIALLY PURE CHLORINE FROM GASES CONTAINING HYDROCHLORIC ACID

William Mason Grosvenor, Jr., and Isador Miller, New York, N. Y., assignors to W. M. Grosvenor Laboratories, Inc., New York, N. Y., a corporation of New York No Drawing. Application April 16, 1937, Serial No. 137,208

13 Claims. (Cl. 23—219)

This invention relates to improvements in the recovery of chlorine and in its broadest aspect comprises the production of chlorine gas either from hydrochloric acid gas or from certain compounds or derivatives thereof, such as ammonium chloride, which may readily be vaporized and dissociated in the gaseous phase into free hydrochloric acid. It thus affords a simple and effective means of recovering and utilizing the chlorine values in a large number of industrial wastes or byproducts, such, for example, as certain gases, liquors, and solids obtained in organic chlorinations, the manufacture of salt cake, the treatment of ores and petroleum, the preparation of synthetic resins and ethylene glycol derivatives, the production of soda ash by the ammonia soda process and the like. As compared with the chief commercially used method of producing chlorine (by electrolysis of salt), the economic operation of our process does not depend upon either the demand for, or the price of, another product, e. g., caustic soda. In its more particular application to the treatment of ammonium chloride, it provides a means of not only recovering the chlorine content thereof as chlorine gas free from admixed hydrochloric acid but also obtaining the ammonium values as gaseous ammonia or ammonia liquor free from contaminants.

Briefly summarized, our process includes the cyclic application or periodic repetition of two distinct gas-solid phase reactions, of which the first may include two separate steps and which may be distinguished from each other by the fact that in the first reaction the main component—the hydrochloric acid—enters as a gas but is converted to a solid compound whereas in the second reaction the conditions are reversed, that is, the main component—the chlorine—enters as a solid derivative and is converted into a gaseous end product.

As distinguished from known processes of the alternating or cyclic type (such as those described by Mond, British Patents 66 and 8,308 of 1886, U. S. Patents 416,038 and 529,130; Bale, British Patents 15,346 of 1892, 14,000 and 14,001 of 1887; Deacon, U. S. Patent 165,802), which treat hydrochloric acid and/or ammonium chloride vapor with metal oxides and which depend upon the alternate formation of metal chloride and oxide, our invention differs essentially in the method, in the solid converting mass, in the purity of product and in the completeness of conversion even though some of the basic chemical reactions involved are of the same kind. Broadly speaking, processes of the prior art in this class comprised the alternation of a first or chlorination reaction and a second or oxidation reaction; in the first the vapors of hydrochloric acid, and/or ammonium chloride, were passed over a mass which included a metal as oxide (preferably nickel or magnesium in Mond, magnesium in Bale and iron in the form of pyrites cinder in Deacon). By these means the chloride of the metal was formed which, in a subsequent oxidation with air, was reconverted to oxide with the liberation of a dilute chlorine, but always contaminated with hydrochloric acid (Mond, U. S. Patent 416,038, lines 27–37). As we have confirmed by tests of these procedures, neither the mode of operation of the process nor the composition of the mass was, or could be, so controlled as to make possible the production of chlorine free from hydrochloric acid, in spite of the many modifications in both these factors that were suggested. Another serious disadvantage inherent in the composition of the mass was, on the one hand, the relative volatility of the metal chloride present, as iron or nickel chloride, or else the formation of basic or oxychlorides, as magnesium oxychloride, on the other. The former caused rapid exhaustion (hence small converting capacity) of the mass and the latter caused liberation of hydrochloric acid into the produced chlorine because of water persistently held therein and low conversion as well as small capacity. In the treatment of ammonium chloride, such processes had the additional disadvantage that a considerable portion of the chlorine remained as hydrochloric acid and much of the ammonia was either destroyed whenever an attempt was made to use metals which formed higher oxides of the type $M_2O_3$, or recombined with such hydrochloric acid. It was proposed (apparently without success) to avoid this destruction of ammonia by introducing a third stage in which such higher oxides were reduced by treatment with a reducing gas, as hydrogen or producer gas.

Similar fundamental differences in mass, in product, and in completeness of conversion, as well as in principle serve to distinguish our process from those of the catalytic Deacon type (U. S. Patents 85,370 and 141,333). In these, mixtures of hydrochloric acid gas and air or oxygen are continuously but incompletely converted to dilute chlorine-containing gases by passage over porous media (fire-brick, clay, pyrites cinder, etc.) impregnated with copper salts or other catalysts, such as mixtures of copper and alkali salts, rare earths, etc. In addition it should be noted that processes of the Deacon type can be used with hydrochloric acid only and are not adapted for use with ammonium chloride, or similar materials, since it would be exceedingly dangerous as well as ineffective, to produce free chlorine in the presence of free ammonia and water vapor.

More specifically, our invention includes a first, or chlorination reaction, which is carried out within a limited lower temperature range, generally not exceeding a maximum of 400° C. In this stage, the gaseous hydrochloric acid, either free or occurring as a product of vapor dissociation, and preferably dispersed in a stream of inert gas such as nitrogen, is brought into contact with a novel solid mass. This mass includes as one element thereof an actively variable or multivalent carrier metal, as iron, as the higher valent oxide (condemned by Mond and others), which is adapted to combine with hydrochloric acid and exchange the chlorine thereof for oxygen so as to fix the chlorine as a solid anhydrous metal chloride, and to oxidize the hydrogen to water which passes off as steam. In the particular application of our novel process to the treatment of ammonium chloride, and the like, we have discovered that this chlorination reaction must comprise two distinct and closely controlled steps which are rather sharply defined by a difference in temperature, viz., a maximum of about 350° C. for step one and a range of about 360 to 390° C. for step two. A current of inert gas, as nitrogen, is common to both. In this way, all of the ammonia—or similar gaseous product—which is present as free gas in the entering and partly dissociated vapor, is rendered substantially inert during step one of the chlorination stage so that it passes off with the steam and the inert gas which has been used as a dispersing medium and to promote increased dissociation of the ammonium chloride. Under these circumstances, only a relatively small portion of the ammonia which has entered with the inert gas stream as undissociated ammonium chloride vapor may become locked in the carrier mass, presumably forming a double chloride with the multivalent carrier metal present. Step two of the chlorination reaction provides a means of breaking up such double salts whereby the chlorine thereof is made wholly available for quantitative recovery (in the oxidation stage) while the ammonia content is in part destroyed by oxidation to water (steam) and nitrogen which serve to augment the current of inert gas. This sharp control of temperature and the differentiation of the two steps of the chlorination stage, among other things, distinguish our process from known methods of treating ammonium chloride with metal oxides and enable us to limit the losses of ammonia to the relatively small amounts (5 to 10%) which may become locked in the mass during step one. A further advantage lies in the fact that it helps to make possible the recovery of both ammonia and chlorine, each free from hydrochloric acid gas.

Our process further includes a second or oxidation reaction within a higher temperature range above 400° C., preferably about 450–500° C. although in some cases, as later pointed out, the temperature may be as high as 650° C. In this stage, the solid mass now including the multivalent carrier metal as anhydrous chloride produced in the chlorination reaction, is treated with oxygen, or air, whereby the chlorine content of the said metal chloride can be completely liberated as chlorine gas which is substantially free from hydrochloric acid, and the mass reconverted to its original condition as metal oxide adapted for repetition of the cycle.

The sweep-out period between chlorination and oxidation common to processes of the prior art is absent as such in our procedure since the proper execution of the second step of stage one, not only decomposes any residual ammonium chloride or allied products, but fixes the chlorine therefrom and leaves nothing to be swept out or to contaminate the chlorine when liberated in the second cycle.

One element of our invention which further distinguishes it from the prior art is a novel mass which acts quickly to fix the chlorine in the first stage, holds it all firmly till that stage is completed, and releases it fully in the second stage. This mass consists of at least three components, and preferably also a fourth, as follows:

First a chlorine carrier comprising an actively variable or multivalent metal present in substantial amount as a higher valent oxide or chloride, the heat of formation of the former (Bichowsky and Rossini, Thermochemistry of Chemical Substances, New York, 1936) being a little higher, or lower, than that of the latter, and adapted not only to fix chlorine by exchange with oxygen in the chlorination stage, but also to fix oxygen by exchange with chlorine in the oxidation stage (whereby the latter is liberated as gas). Of such metals, iron is the preferred example and as chloride preferably constitutes about 30% or less of the mass. Ferric chloride by itself is, however, too volatile for effective active service at the practical temperature ranges over 300° C. By the term "chlorine carrier" as used in the claims, we mean the multivalent metals having atomic numbers 24 to 29, both inclusive, and in the form of chlorides or oxides.

Second, a "depressant" comprising a relatively non-volatile and stable metal salt present in substantial amount, used as, or adapted to produce, a chloride which may form an eutectic or other complex with the aforementioned carrier. By this component, the volatility of the carrier chloride is so lowered, or depressed, that the oxidation reaction may be conducted at temperatures as much as two or three hundred degrees higher than the normal volatilization temperature of such carrier chloride, without excessive or substantial vaporization (and therefore loss) of the chloride. In contradistinction of all teaching of the prior art, we find that vaporization of the carrier chloride cannot be substantially retarded by admixture with, or formation of, double chlorides of, the alkaline earths or rare earths or the alkalies, even by potassium chloride up to 10% of the carrier, (as recommended by Mond). We have found that potassium chloride is the only reasonably cheap and effective depressant and that it is useful only if present in substantial amount, that is to much more than 10% and preferably at least 20% of the carrier chloride.

Third, a "booster" comprising a metal present as oxide or chloride, in relatively much lesser amount, that is, not necessarily exceeding about 10% of the carrier chloride, and which apparently serves to facilitate the reactions although the exact mechanism of such aid is obscure. It may reduce the surface tension of the depressant and cause it to spread more uniformly and completely over the exterior and the interior surfaces of the support; it may form double compounds which are more labile and active. Whatever the mechanism, the ultimate result is to boost or stimulate the effectiveness and prolong the active life of a given quantity of the carrier and to enable it to liberate the fixed chlorine more easily, more rapidly, more uniformly, at lower temperatures and to a greater extent. Our preferred booster is cadmium which we prefer to introduce as chloride also. By the term "booster" as used in the claims, we mean the chlorides or oxides of those metals which, (a) are predominately bivalent, (b) are not alkali earth metals, (c) do not readily form oxy-chlorides, and (d) form chlorides which do not boil below 300° C.

Fourth, a support for the active metal components comprising a foraminous, porous material preferably constituting about one-third to about two-thirds of the mass dependent, in part, upon the method of temperature control to be used. This support is adapted to present an extended surface of thin solid walls which shall be wettable with the metal salts as used but not too much corroded by either the gases or the hot reacting salt layers with which its porous surfaces are covered. We have used siliceous materials including gelatinous silica but, in its preferred form, the support consists of fragments of calcined diatomite rock from the Lompoc deposit in California.

By the use of multivalent carriers which can form anhydrous chlorides at the temperatures and under the conditions of step one of our chlorination stage instead of the low capacity masses of the magnesia type, we have found it possible to use masses whose chlorine converting capacity in alternating cyclic processes is proportional to the carrier content, that is to the chlorine combining capacity thereof in the higher valent state. The chlorine produced is always free from hydrochloric acid.

In addition to acting as cyclic masses, our masses can also function as high-capacity catalytic masses of the continuous type, yielding at higher temperatures chlorine admixed with some 20-30% of unconverted hydrochloric acid in accordance with the thermodynamics and equilibria of the so-called Deacon reaction. We have further discovered that, by a novel process and arrangement of apparatus combining a cyclic process with a continuous Deacon catalytic type we can obtain a novel result; that is, in effect, the continuous quantitatively complete oxidation or conversion of hydrochloric acid into highly concentrated chlorine. Whether used as simple continuous catalytic Deacon or as a combination of continuous Deacon and cyclic process, our mass makes possible capacities far in excess of those obtainable with any of the Deacon copper masses recommended in the art, and in addition we can obtain chlorine concentrations up to eight or nine times as high as those resulting from an ordinary Deacon process.

A suitable mass for use in the specific examples cited below may be prepared by calcining massive Lompoc diatomite rock at about 1000° C. till its component skeletons become well bonded, breaking or cutting it to the form of irregular chips or lumps about 15-25 millimeter mean diameter. These are treated with successive portions of an aqueous solution of the mixed metal chlorides, drying between successive treatments, until the dry weight is increased by 25% to 200% or more of the original weight of the chips. The solution referred to may contain

|  | Parts |
|---|---|
| FeCl₃·6H₂O | 150 |
| CdCl₂·2½H₂O | 10 |
| KCl | 50 | dissolved in 450-600 parts water, for repeated wettings and dryings to obtain 200% increase. It may be correspondingly dilute, or less of the solution may be used to secure lower proportions of metals. In the solution above referred to, the anhydrous chlorides are in the ratio of approximately ferric chloride 90 parts, cadmium chloride 8 parts, and potassium chloride 50 parts. Computed as metals, they are present in the ratio of approximately 31 parts iron, 5 parts cadmium, and 26 parts potassium. After the final drying at 100-120° (during which the mass may lose some HCl by hydrolysis of FeCl₃), the mass is loaded into a suitable converter, dried in a current of nitrogen, air, or oxygen, first at temperatures up to 350° C. It is then heated in a stream of air or oxygen at 450-500° C. until no more chlorine is evolved. The mass will now be in the active stage adapted for converting hydrochloric acid into chlorine. All of its iron appears to be present as ferric oxide.

As stated above, the hydrochloric acid converting capacity of such a mass in alternating cyclic processes will be equal to the available iron content in accordance with the equations:

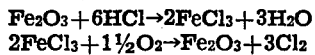

$$Fe_2O_3 + 6HCl \rightarrow 2FeCl_3 + 3H_2O$$
$$2FeCl_3 + 1\tfrac{1}{2}O_2 \rightarrow Fe_2O_3 + 3Cl_2$$

The specific mass and method described are to be considered only as an example of one suitable mass and one method of preparing the same, and not as a limitation of either mass or method. Likewise, we do not limit ourselves thereby either to the components, or the amounts in which any one of them may be present. Any element may vary within wide limits and the individual components of the mass may be replaced by equivalents and obviously different methods of preparation may be used. For example, the diatomaceous earth may be replaced by silica gel, and more or less effectively by clay, alumina, or other foraminous, porous, inert material. We believe it acts chiefly as a support and dispersing place for the active metal salts. By suitable combinations of carrier, depressant and booster, iron, for example, may be replaced in whole or in part by chromium, or other metals, even nickel, some of which, however, are less effective than iron. From a practical and economic standpoint, we prefer iron. Cadmium may be replaced by some of the other bivalent metals as lead, copper, beryllium, nickel, cobalt, cerium, etc. Obviously if nickel be used as the chlorine carrier, it would not also be used in the same mass as a reaction booster. Bivalent metals which readily form oxychlorides as bismuth and magnesium are unsuitable. Mixtures of metals of the same class may also be used. However, in our experience we have found none of the common salts to be so effective a depressant as potassium chloride for any mass containing iron, even though used in our large proportion.

To further illustrate our invention, but not as limitations thereof, we shall describe three specific examples of the application of the mass described above to the production of chlorine from hydrochloric acid and a fourth to illustrate its particular adaptation to the treatment of ammonium chloride waste liquors from the ammonia soda process for the recovery of ammonia and chlorine gas free from hydrochloric acid. In the claims, the term "hydrochloric acid" is used to define the source of the chlorine in vapor phase, whether such source be hydrochloric acid in a pure state, or accompanied by an inert gas, or accompanied by ammonia and resulting from dissociation of such a compound as ammonium chloride.

*Example 1*

About 85–90 parts (dry weight in the oxide stage) of the above specific mass are loaded into a suitably heated tube or converter in a layer (or layers) about a meter deep between two layers about 0.2 meter deep of small fragments of broken porcelain or other inert material. Suitable means of temperature reading and control are, of course, provided. A measured amount of hydrochloric acid gas, moist or dry, is passed through at 230–250° C. with or without air, oxygen, nitrogen, or other inert gas for temperature control and to help sweep out the water vapor carried in and formed, until the chlorine fixation step is about ended, when remaining moisture should be swept out if chlorine free from traces of hydrochloric acid is desired. As soon as that amount of hydrochloric acid corresponding to the effective chlorine capacity of the carrier (in this case about 20–25 parts chlorine) has been introduced, leaving a small portion of the carrier unconverted so as not to waste hydrochloric acid, the temperature of the converter is raised to 450–500° C., and a current of dry oxygen (or dry air if weaker chlorine gas is satisfactory) is passed through the mass. Substantial conversion starts at about 450° C. For practical purposes, conversion can be made complete at 490–510° C. controlled by the proper regulation of the volume, velocity and degree of preheating of the gas. After substantially all the chlorine has been recovered, the temperature can then be lowered to 230–250° C., and the hydrochloric acid-air cycle repeated. During the lower temperature, or chlorination, stage the effluent gas will consist of steam and the inert sweep out gas, and will not contain chlorine, free or combined. In the higher temperature, or oxidation stage, the effluent will consist of chlorine and the unused portion of the oxygen (or air), substantially free from hydrochloric acid. The chlorine concentration may vary between ten and twenty volume percent if air is used and twenty to forty volume percent if oxygen is used as oxidant, but can readily be controlled to average about twelve percent gas in the former instance and about thirty percent gas in the latter.

The per diem capacity of the mass used in this way is approximately 6–8 complete cycles corresponding to a chlorine producing capacity approximately 2–3 times the weight of the mass. The loss of carrier by volatilization is negligible.

Variations in the booster chosen may necessitate slight variations in the operating conditions, particularly the optimum temperature for carrying out the second, or oxidation stage. For example, a lead booster will require an operating temperature of 525–550° C., and similar changes may be involved with other boosters. In general, the booster should be so chosen that in conjunction with other factors, the maximum temperature does not exceed 650° C.

*Example 2*

A set of three converters loaded as in Example 1 is connected in such a way that the first and the third can be alternated either to precede or to follow the second or center converter. At the beginning of the operation a current of oxygen (or air) is introduced into the first converter and the temperature is so controlled that the gas on leaving the first converter is at approximately 475°; this gas enters the second converter, maintained at 475–500° C. throughout the process where it joins an incoming stream of hydrochloric acid in such amount that the volume ratio of HCl to oxygen is not more than 2 or 2.5 to 1. At the temperature indicated, the hydrochloric acid is continuously and catalytically converted to chlorine and water in accordance with the reversible equation:

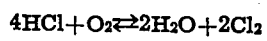

$$4HCl + O_2 \rightleftarrows 2H_2O + 2Cl_2$$

Under the above conditions the equilibrium will be approximately 70% chlorine, 30% unconverted hydrochloric acid. The effluent gas, consisting of chlorine, hydrochloric acid, steam and excess oxygen, enters converter three which is suitably maintained at 250–300° C. Here the unconverted hydrochloric acid content is fixed as carrier chloride with the liberation of more steam but the chlorine does not react so that the effluent, consisting of chlorine, steam, and oxygen can be readily treated for removal of chlorine and water and the excess oxygen returned to converter one if desired. As soon as the carrier in converter three has become saturated with chlorine the connections are changed so that three may next function as one formerly did (that is, receiving oxygen) and one may next function as three formerly did (that is, receiving the effluent from two). Converter three is quickly brought to 475–500° C. and oxygen introduced so that the carrier chloride is reconverted to oxide, the chlorine is liberated and passes, with excess oxygen at 475–500° C. into the second converter and so the cycle is continued indefinitely, converter two always functioning as a continuous catalytic Deacon at 475–500° C., and converters one and three alternately as oxidizers at 475–500° C. and chlorinators at 250–300° C. By maintaining the oxygen at such a rate that the gases entering the second converter are in the proportion of 2 to 2.5 volumes hydrochloric acid to one volume oxygen, and so regulating the gas feeds and/or the number of converters in either of the alternate stages that the time of oxidation or the carrier capacity available in the one stage is equal or proportional to the time of chlorination or the carrier capacity available in the other stage, it is possible, with oxygen, to obtain a continuous, relatively uniform production of gas containing up to 70 volume percent chlorine free from hydrochloric acid using only one converter as a continuous catalytic Deacon. The novel result thus obtained is the continuous conversion or oxidation of hydrochloric acid to chlorine at relatively high concentration and free from hydrochloric acid. Operating in this way, the daily chlorine producing capacity of the mass in all three converters is approximately five times its own total weight. After continuous operation for some time the carrier in the second so-called Deacon converter will ultimately become saturated with chlorine by a slow progressive conversion to carrier chloride as the reaction rate for carrier chloride formation is appreciably greater than the rate for the formation of carrier oxide. In this way, the effective catalytic action of the carrier will be gradually lessened. From time to time the hydrochloric acid supply may, therefore, be temporarily stopped or diverted to another triple set, preferably when the oxidation of a converter has been completed. The rate of oxygen supply is suitably reduced and the carrier in the Deaconing converter is quickly brought back to its original activity in the oxide condition so that the continuous cycle may be resumed.

*Example 3*

A set of five converters hereafter referred to as No. I to No. V, each loaded as in Example 1 so that all the carrier mass is oxidized, is connected in series so that the gases will pass progressively from the No. I to No. V. In order to start a continuous operation, No. I should be brought to the state in which the carrier in that converter is to be when operating in a continuous cycle. For this purpose, the mass in No. I is treated with hydrochloric acid gas in the usual way to convert substantially all its active carrier content to the chloride as illustrated in the chlorination stage of Example I, after which the hydrochloric acid feed is stopped. The converters are now connected in series. The temperature of No. I is then brought to approximately 475° C. and a current of oxygen introduced maintaining No. I at a temperature of 475–500° C. throughout. The oxygen converts the carrier chloride to oxide, liberating chlorine. The exit gases, at 475–500° C. consisting of chlorine and excess oxygen pass into No. II suitably maintained throughout this stage of the operation at 490–510°, where they join an incoming stream of hydrochloric acid gas in such amount that the volume ratio of hydrochloric acid to oxygen does not exceed about 2 or 2.5 to 1. As noted in Example 2, at the temperature indicated, No. II therefore functions as a continuous catalytic Deacon with approximately seventy percent chlorine producing equilibrium. The exit gases from No. II containing the total chlorine produced in No. I and No. II admixed with steam, excess oxygen, and unconverted hydrochloric acid, pass into No. III, suitably maintained at 500–400° C. Here some of the unconverted hydrochloric acid will be fixed as carrier chloride and some catalytic Deaconing may also take place. The exit gases from No. III consist of chlorine and steam with a smaller content of hydrochloric acid and the excess oxygen and pass into No. IV suitably maintained at 400–350° C. where some of the remaining unconverted hydrochloric acid is fixed as carrier chloride. The exit gases leaving No. IV at about 350° C. and containing chlorine, steam, oxygen, and the relatively smaller amount of unconverted hydrochloric acid now pass into converter No. V suitably maintained at approximately 350–250° C. where this residual hydrochloric acid, if any, is fixed. The effluent from No. V therefore consists of chlorine, steam, and excess oxygen which can be readily treated for removal of the chlorine and the water, the excess oxygen being returned to the cycle at No. I, if desired. As soon as the carrier in No. I has yield its load of chlorine, the connections between converters are changed, and the temperatures adjusted, so that No. II may next function as No. I did, that is, No. II at 475–500° C. will receive oxygen, No. III may next function as No. II did, that is, at 490–510° C. and will receive hydrochloric acid, No. IV may next function as No. III did, that is at 500–400° C. partially to fix hydrochloric acid, No. V may next function as No. IV did, that is, at 400–350° C. to fix more hydrochloric acid, and No. I may next function as No. V did, that is at 350–250° C. to fix the residual hydrochloric acid, if any, and yield a gas containing only chlorine, water and oxygen. By suitably regulating the temperatures, the volume and the gas ratios, that is maintaining a ratio of 2 to 2.5 volumes HCl to 1 volume oxygen in the gases entering the catalytically Deaconing converter, it is possible to maintain the cycle indicated so as to obtain the same novel result as by Example 2, that is, the continuous conversion of hydrochloric acid into high concentration chlorine (approximately 70 volume percent) at a rate yielding daily approximately five times as much chlorine as the total weight of the mass in the five converters. Compared to the process described in Example 2, however, this method has the added advantage that it is not necessary to discontinue the Deaconing converter periodically to regenerate the mass, as any given converter acts as a Deacon only for a single stage of the cycle and is immediately regenerated in the next following step of every cycle since it becomes the receiver of oxygen under oxidation conditions.

Other arrangements in series of such a set of five or more converters will suggest themselves whereby with proper regulation of gas flow in either direction relative to the converters, and proper dilution, distribution and cooling (or heating) of the mass for heat control of the reaction, it becomes possible to run two or more converters in the oxidizing stage preceding and two or more in the chlorinating stage following the Deaconing converter, or in other ways. Of course with a larger number of converters it is easier to provide one or more which can be cut out or bypassed for making repairs, replacing the mass, or other purposes.

Regardless of the number of converters, however, the same novel process as in Example 2 is here obtained; to wit, a process of combining an alternate cyclic two-stage chlorination-oxidation process with a continuous catalytic conversion in such a way that a converter operating a continuous catalytic process is always preceded by one or more converters operating in the oxidizing and chlorine producing stage and is also always followed by one or more converters operating in the chlorinating or chlorine fixing stage of an alternating process. Obviously from the machine point of view the same novelty of equipment for carrying out the recovery of chlorine is shown by passing the chlorine and other gases from the second or liberating step of an alternating cyclic process into the gases undergoing a strictly one stage catalytic process and thence into the first or fixative stage of the cyclic process.

*Example 4*

For the purpose of recovering ammonia and chlorine in the ammonia soda process for the production of soda ash, the usual procedure in that industry may be followed until the sodium bicarbonate has been separated by filtration. The mother liquors from such filtration, combined with all ammonia-bearing wash-liquors, drainings, etc. may then be run into the usual still and all so-called free $NH_3$ removed and recovered, leaving a liquor containing $NH_4Cl$, Na₂CO₃, and about one-quarter of the NaCl originally present in the ammoniated brine. Instead of then adding lime to liberate the combined NH₃ from its chloride (as is the usual practice), and thus wasting all soda salts and chlorine with CaCl₂ sludge, the liquors may be further concentrated to approximately one-fourth their original volume. In an ordinary ammonia soda operation this will mean the evaporation of 175–200 cubic feet of water per ton of soda ash produced. The concentration of unreacted excess sodium chloride is thus brought to substantial saturation hot or cold. Upon cooling, however, 75–80% of the total ammonium chloride present in the still charge will crystallize out as ammonium chloride (purity about 95% or better). This may be separated, dried, and then treated as described below to recover about 90–95% of the NH₃ values and as much as 98% of the chlorine. Other methods may be used for separating the NH₄Cl as no novelty is claimed for the method described nor is it an essential part of our process which is restricted to the treatment of ammonium chloride whether or not accompanied by salt for the purpose indicated.

The dry, solid, ammonium chloride is heated and vaporized in a suitably constructed vaporizer, which may be built as a screw conveyor in which ammonium chloride flows countercurrent to a stream of inert gas, for example nitrogen under conditions such that the ammonium chloride will be vaporized and carried along in the stream of inert gas, at temperatures between about 280–330° C., but not exceeding 350° C. Any convenient flow of nitrogen may be chosen, a suitable rate being such as to give a volume ratio of five parts nitrogen to one part NH₄Cl vapor. Under these circumstances, the NH₄Cl will be about 75% dissociated and, therefore, the vapor will consist of approximately 75% of the total ammonia as free NH₃, 75% of the total HCl as free HCl and 25% of undissociated NH₄Cl accompanied by the nitrogen. This partly dissociated vapor is carried with the stream of nitrogen into a converter, loaded as in Example 1 and suitably controlled to maintain a temperature of 280–330°, not exceeding 350° during this step (step one) of the chlorination stage. The free HCl present in the vapor reacts with the carrier to form carrier chloride and steam but the equivalent free NH₃ does not react and passes out as such with the effluent gases. Of the undissociated NH₄Cl, the major portion does not react and is carried out with the effluent. A smaller portion, however, corresponding to approximately one-fourth to one-third of such undissociated ammonium chloride may react, presumably to form a double chloride. This portion of such undissociated ammonium chloride therefore becomes locked in the mass. The effluent from the converter in this step consists of ammonia, steam, nitrogen, and ammonium chloride, and can readily be treated for separation of ammonia and water, on the one hand, and ammonium chloride, on the other. The latter may be returned to the system, if desired.

After an amount of dissociated chloride vapor corresponding to the greater part of the available chlorine capacity of the carrier has been introduced, the supply is stopped but the stream of nitrogen is continued. The temperature of the mass is brought to about 360–390° C. but not higher than 400° C. and maintained in this range for step two of the chlorination stage. Within this range the locked-in NH₄Cl is apparently attacked, liberating the HCl content thereof which immediately reacts with further carrier to form carrier chloride and steam. In this way all the chlorine becomes fixed and available for liberation in the oxidation stage. The corresponding amount of NH₃ (that is, the NH₃ in the locked-in NH₄Cl) may, however, be more or less destroyed to water and nitrogen which join the gas stream so that the effluent in this step consists essentially of nitrogen and steam only. All the nitrogen used in both steps may be recovered and recirculated if desired. Any other inert non-oxidizing gas, stable under these conditions can be used in steps one and two of the first or chlorine fixing stage of the operation.

Upon completion of the second step of the chlorination stage, the second or oxidation stage is initiated by raising the temperature in the converter, to about 425–450° C. This may be done by circulating hot nitrogen or by any other convenient means. The flow of nitrogen may now be stopped and a stream of more or less heated oxygen (or air if more dilute chlorine is desired) be introduced while the temperature of the converter is further raised, as by the heat of reaction, to about 475–500° C. The converter now functions in the oxidation stage exactly as described under Example 1. Operating conditions, yield and product are substantially the same. All of the chlorine fixed in either step 1 or step 2 of the first or chlorination stage is recovered as gas substantially free from hydrochloric acid.

The NH₃ recovered as such will, as stated, correspond to substantially all the free NH₃ in the vapour introduced. The ammonia recovery will be about 75% as free NH₃ and 15–20% as recovered NH₄Cl. About 5–10% of the NH₃ will be destroyed.

The chlorine recovered as gas in the second or oxidation stage will correspond to substantially all the free HCl in the vapor introduced plus the HCl equivalent of the destroyed NH₃. The remainder will be recovered as NH₄Cl in the chlorination stage. The total chlorine recovery will, therefore, be about 80–85% as chlorine gas and 15–20% as NH₄Cl. Chlorine recoveries of about 98% have been obtained by us.

It is well known that equilibria are shifted not only by temperature but in gaseous reactions also by partial pressure of the reacting gases. We have given temperatures and gaseous conditions for approximately normal atmospheric total pressure but, as the process is described and claimed, it will be understood that temperatures, proportions, velocities, and concentrations can be shifted by marked changes of total pressure without departing from the invention or avoiding claims where temperatures, proportions, partial pressures are factors.

This application is a continuation, in part, of prior applications Serial Nos. 75,552, 78,141, and 125,066.

Having thus described our invention, what we claim as new and desire to secure by Letters Patent is:

1. A mass adapted for the conversion of hydrochloric acid into chlorine free from hydrochloric acid, including a "chlorine carrier" selected from the group consisting of the chlorides and oxides of multivalent metals having atomic numbers 24 to 39, a reaction "booster" selected from the group consisting of the chlorides and oxides of those metals, other than alkali earth metals, which are predominantly bivalent and which do not readily form oxychlorides and the chlorides of which do not boil below 300° C., potassium chloride in an amount in excess of 20% of the carrier, and an inert support.

2. A mass adapted for the conversion of hydrochloric acid into chlorine free from hydrochloric acid, including a porous inert support, a compound selected from the group consisting of chlorides and oxides of iron, nickel, and chromium, a compound selected from the group consisting of oxides and chlorides of nickel (if nickel is not selected from the first mentioned group) cadmium, lead, copper, beryllium, cobalt and cerium in an amount less than 20% of the first-mentioned compound, and potassium chloride in an amount in excess of 10% of the first-mentioned compound.

3. A mass adapted for the conversion of hydrochloric acid into chlorine free from hydrochloric acid, including a porous inert support, a compound selected from the group consisting of chlorides and oxides of iron, nickel, and chromium, cadmium chloride in an amount less than 10% of said salt, and potassium chloride in an amount in excess of 20% of said compound.

4. A mass adapted for the conversion of hydrochloric acid into chlorine free from hydrochloric acid, including a porous inert support, iron chloride, a metallic salt selected from the group consisting of chlorides of cadmium, lead, copper, beryllium, nickel, cobalt and cerium, and potassium chloride in an amount in excess of 20% of the iron chloride.

5. A mass adapted for the conversion of hydrochloric acid into chlorine free from hydrochloric acid, including a porous inert support, a compound selected from the group consisting of chlorides and oxides of iron, nickel, and chromium, lead chloride in an amount less than 10% of said salt, and potassium chloride in an amount in excess of 20% of said compound.

6. A mass adapted for the conversion of hydrochloric acid into chlorine free from hydrochloric acid, including a porous inert support, and chlorides of iron, cadmium, and potassium, said chlorides being present in approximately the proportions of about 31 parts iron, about 5 parts cadmium, and about 26 parts potassium calculated as metals.

7. The process of recovering chlorine from gases containing hydrochloric acid which consists in passing said gases over a mass, including a "chlorine carrier" selected from the group consisting of the chlorides and oxides of multivalent metals having atomic numbers 24 to 39, a reaction "booster" selected from the group consisting of the chlorides and oxides of those metals, other than alkali earth metals, which are predominantly bivalent and which do not readily form oxychlorides and the chlorides of which do not boil below 300° C., and potassium chloride in an amount in excess of 20% of the "chlorine carrier", separating steam and other gaseous products and diluents left by the treatment of said gases by said mass, and then passing an oxygen containing gas over said mass, thereby liberating the chlorine and recovering it admixed with excess oxygen but substantially free from hydrochloric acid.

8. The process of recovering chlorine from gases containing hydrochloric acid which consists in passing said gases at a temperature below 400° C. over a mass, including a compound selected from the group consisting of chlorides and oxides of iron, nickel, and chromium, a second salt selected from the group consisting of chlorides and oxides of nickel (if nickel is not selected from the first mentioned group) cadmium, lead, copper, beryllium, cobalt and cerium, and potassium chloride in an amount in excess of 20% of the first-mentioned compound, then passing an oxygen containing gas over said mass at a temperature in excess of 400° C., thereby liberating the chlorine quantitatively and recovering it admixed with excess oxygen but substantially free from hydrochloric acid.

9. The process of recovering chlorine from gases containing hydrochloric acid which consists in passing said gases at a temperature below 400° C. over a mass, including a compound selected from the group consisting of chlorides and oxides of iron, nickel, and chromium, a second compound selected from the group consisting of nickel (if nickel is not selected from the first mentioned group) chlorides and oxides of cadmium, lead, copper, beryllium, cobalt and cerium in an amount less than 10% of the first-mentioned compound, and potassium chloride in an amount in excess of 20% of the first-mentioned compound, then passing an oxygen containing gas over said mass at a temperature in excess of 400° C., thereby liberating the chlorine quantitatively and recovering it admixed with excess oxygen but substantially free from hydrochloric acid.

10. The process of recovering chlorine from hydrochloric acid, which includes passing a gas containing hydrochloric acid and a gas containing oxygen alternately over a mass consisting of an inert support, a "chloride carrier" selected from the group consisting of the chlorides and oxides of multivalent metals having atomic numbers 24 to 39, a reaction "booster" selected from the group consisting of the chlorides and oxides of those metals, other than alkali earth metals, which are predominantly bivalent and which do not readily form oxychlorides and the chlorides of which do not boil below 300° C., and potassium chloride in an amount in excess of 20% of the "chlorine carrier", the passage of the chlorine containing gas being first at a temperature not exceeding 350° C. and then at a higher temperature not exceeding 400° C. to free said mass from undesirable reaction products, and the oxygen containing gas being passed over said mass at a temperature in excess of 400° C., said potassium chloride preventing the volatilization of any portion of said chlorine carrier at said last-mentioned temperature.

11. The process of recovering chlorine from hydrochloric acid, which includes passing a gas containing hydrochloric acid and a gas containing oxygen alternately over a mass consisting of an inert support, a "chlorine carrier" selected from the group consisting of the chlorides and oxides of multivalent metals having atomic numbers 24 to 39, a reaction "booster" selected from the group consisting of the chlorides and oxides of those metals, other than alkali earth metals, which are predominantly bivalent and which do not readily form oxychlorides and the chlorides of which do not boil below 300° C., and potassium chloride in an amount in excess of 20% of the "chlorine carrier", the passage of the chlorine containing gas being first at a temperature not exceeding 350° C. and then at a higher temperature not exceeeding 400° C. to free said mass from undesirable reaction products, and the oxygen containing gas being passed over said mass at a temperature in excess of 400° C., said potassium chloride preventing the volatilization of any portion of said "chlorine carrier" at the normal volatilizing temperature of said "chlorine carrier".

12. The process of recovering chlorine from gases containing ammonia and hydrochloric acid which comprises exposing said gases to a mass, including a compound selected from the group consisting of chlorides and oxides of iron, nickel, and chromium, a second compound selected from the group consisting of chlorides and oxides of nickel (if nickel is not selected from the first mentioned group) cadmium, lead, copper, beryllium, cobalt, and cerium, and potassium chloride present to an extent of more than 20% of the first-mentioned compound, said mass being at a temperature of between 250° C. and 350° C., then continuing the passage of said gases at a temperature of between 350° C. and 400° C. for sufficient length of time to decompose any ammoniacal compounds formed between the ammonia and any ingredients of said mass, and then passing an oxygen containing gas over said mass at a temperature in excess of 400° C. for a sufficient length of time to convert said first-mentioned compound to an oxide and to liberate chlorine free from hydrochloric acid.

13. The process of obtaining chlorine from hydrochloric acid which comprises passing hydrochloric acid and an inert gas over a mass, including an iron oxide, cadmium chloride, and potassium chloride in the approximate proportions of about 31 parts of iron, about 5 parts of cadmium, and about 26 parts of potassium calculated as metals and at a temperature of 320° C. to 345° C. until the iron oxide has been converted to iron chloride to a substantial extent, then raising the temperature to between 350° C. and 400° C. while continuing the flow of the inert gas until all ammoniacal compounds in said mass have been decomposed, and thereafter raising the temperature to about 400° C. and passing oxygen containing gas over the mass at a temperature of about 450° C. to 550° C., said potassium chloride acting to prevent the volatilization of said iron chloride during said last-mentioned step.

WILLIAM MASON GROSVENOR, Jr.
ISADOR MILLER.